United States Patent
Hirose et al.

(10) Patent No.: US 7,719,986 B2
(45) Date of Patent: May 18, 2010

(54) BANDWIDTH CONTROL DEVICE, COMPUTER READABLE RECORDING MEDIUM STORING PROGRAM AND METHOD OF CONTROLLING BANDWIDTH CONTROL DEVICE

(75) Inventors: Ryota Hirose, Hamamatsu (JP); Mitsuhiro Onoda, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 198 days.

(21) Appl. No.: 12/148,806

(22) Filed: Apr. 23, 2008

(65) Prior Publication Data

US 2008/0253397 A1  Oct. 16, 2008

Related U.S. Application Data

(63) Continuation of application No. 11/215,772, filed on Aug. 30, 2005, now abandoned.

(30) Foreign Application Priority Data

Aug. 31, 2004   (JP)  .............................. 2004-251321

(51) Int. Cl.
*H04J 3/16* (2006.01)
(52) U.S. Cl. ...................................... 370/235; 370/468
(58) Field of Classification Search ................. 370/224, 370/231, 235, 236, 252, 389, 395.21, 412, 370/425, 465, 468, 470, 471
See application file for complete search history.

(56) References Cited

U.S. PATENT DOCUMENTS

| 4,663,748 | A | * | 5/1987 | Karbowiak et al. | .......... 370/224 |
| 5,187,707 | A | * | 2/1993 | Chu et al. | .................... 370/236 |
| 5,559,796 | A | * | 9/1996 | Edem et al. | .................. 370/412 |
| 5,706,281 | A | * | 1/1998 | Hashimoto et al. | .......... 370/252 |
| 5,850,399 | A | * | 12/1998 | Ganmukhi et al. | .......... 370/412 |
| 2001/0007562 | A1 | * | 7/2001 | Matsuoka et al. | ........... 370/415 |
| 2002/0122387 | A1 | * | 9/2002 | Ni | .............................. 370/231 |
| 2004/0151187 | A1 | * | 8/2004 | Lichtenstein | ........... 370/395.21 |

FOREIGN PATENT DOCUMENTS

JP         2002-368799         12/2002

\* cited by examiner

*Primary Examiner*—Kwang B Yao
*Assistant Examiner*—Andrew Lai
(74) *Attorney, Agent, or Firm*—Pillsbury Winthrop Shaw Pittman LLP

(57) ABSTRACT

A register stores the earliest time (IRL) at which a packet can be subsequently transmitted from a transmitting device in order to obey an allowable bandwidth given to the transmitting device, the earliest time (RL-1 to n) at which the packet of each class can be transmitted in order to obey the allowable bandwidth of the class, and a final time (RG-1 to n) at which the packet of each class is to be subsequently transmitted in order to maintain the guarantee bandwidth of the class. When a packet transmittable timing is reached, the packet of a class m which the final time (RG-1 to n) approaches is transmitted preferentially from the classes in which a current time reaches the earliest time (RL-1 to n). When the transmission of a packet is started, the next earliest time (IRL), earliest time (RL-m) of the class m and final time (RG-m) is determined based on the data volume of the packet.

6 Claims, 5 Drawing Sheets

BANDWIDTH CONTROL DEVICE, COMPUTER READABLE RECORDING MEDIUM STORING PROGRAM AND METHOD OF CONTROLLING BANDWIDTH CONTROL DEVICE

CROSS REFERENCE TO RELATED APPLICATIONS

This application is a continuation of application Ser. No. 11/215,772, filed Aug. 30, 2005, which claims priority from Japanese application No. 2004-251321, filed Aug. 31, 2004, the disclosures of which are incorporated herein by reference.

BACKGROUND OF THE INVENTION

The present invention relates to a bandwidth control device, a computer readable recording medium storing a program which are suitable for use in a packet communication network, and a method of controlling the bandwidth control device.

In a packet communication network, the limitation of a communication bandwidth is set to the interface of a terminal itself which is connected to the communication network. Moreover, a packet to be transmitted through the terminal is classified into any of a plurality of classes (for example, the uses of a packet) and the communication bandwidth is limited to a predetermined maximum value or less for each class or a communication bandwidth having a predetermined guaranteed bandwidth or more is maintained in many cases. For example, in Patent Document 1, there has been disclosed a technique for transmitting a packet while limiting a bandwidth for a plurality of classes. In the same document, first of all, a packet queue (the list of a packet to be transmitted sequentially) is created for each class of the packet. When a new packet is generated, a transmission scheduling time is determined corresponding to a class belonging to the same packet and the packet is added to the packet queue of the class together with the transmission scheduling time. Moreover, a prior transmission reserving queue and a non-prior transmission reserving queue which are shared by all of the classes are created and a packet output from each packet queue is sorted in order of a transmission scheduling time in the prior (or non-prior) transmission reserving queue. The packet stored in the prior transmission reserving queue is sequentially transmitted in order of the transmission scheduling time.

Patent Document 1: JP-A-2002-368799 Publication

According to the technique described in the Patent Document 1, however, each packet is transmitted after it is stored in two stages, that is, a packet queue for each class and a prior (or non-prior) transmission reserving queue. For this reason, there is a problem in that a memory capacity to be mounted on a terminal is increased and a control becomes complicated. Furthermore, there is a problem in that the limit value of the communication bandwidth of the whole interface of a terminal cannot be specified in the technique. More specifically, the limit value of the communication bandwidth of the whole interface is equal to the sum of the limit value of a communication bandwidth for each class. If the communication bandwidth of the whole interface is to be set to have a smaller value than the sum, it is necessary to further provide bandwidth control means for a leaky bucket in the latter stage of the prior (or non-prior) transmission reserving queue, and a required memory capacity is increased still more and a control becomes complicated still more.

SUMMARY OF THE INVENTION

In consideration of the circumstances, it is an object of the invention to provide a bandwidth control device and a program which can give a bandwidth guarantee and a bandwidth limitation for each of classes while controlling a memory capacity and can limit the communication bandwidth of the whole interface of a terminal independent of the bandwidth limitation of each class.

In order to solve the problems, the invention is characterized by the following structures. The designations in parentheses are illustrative.

A first aspect of the invention is directed to a bandwidth control device for limiting or guaranteeing a bandwidth for each of classes when transmitting a packet belonging to any of the classes to a communication network, comprising a first register (32) for storing an interface limiting time (IRL) to be the earliest time at which a packet can be subsequently transmitted from a transmitting device for transmitting a packet to the communication network in order to control a communication bandwidth of the transmitting device to be equal to or smaller than an allowable bandwidth (Ls) permitted for the transmitting device, a second register (42-$m$) provided for each of the classes and serving to store a class limiting time (RL-m) to be the earliest time at which a packet of a corresponding class can be subsequently transmitted in order to control a communication bandwidth of the class to be equal to or smaller than an allowable bandwidth of the class, a third register (44-$m$) provided for each of the classes and serving to store a class guarantee time (RG-m) to be a final time at which a packet of a corresponding class is to be subsequently transmitted in order to give the class a communication bandwidth which is equal to or greater than a guarantee bandwidth of the class, class determining means (SP30 to SP46) for determining, as a transmitting object class, a class from which a packet is to be transmitted based on the class limiting time (RL-m) and the class guarantee time (RG-m) in each of the classes, transmitting means (14, SP48) for transmitting a packet belonging to the transmitting object class, and recalculating means (SP50) for recalculating the interface limiting time (IRL), the class limiting time (RL-m) of the transmitting object class, and the class guarantee time (RG-m) of the transmitting object class based on a data volume of the packet belonging to the transmitting object class and storing results of the recalculation in the first to third registers.

Referring to a structure according to a second aspect of the invention, moreover, in the bandwidth control device according to the first aspect of the invention, the class determining means (SP30 to SP46) determines, as the transmitting object class, any of the classes having the class guarantee time (RG-m) delayed from a current time (SC) which is detected irrespective of the interface limiting time (IRL) when the same class is detected (a decision of "NO" is obtained at SP34), and determines, as the transmitting object class, any of the classes having the earliest class guarantee time (RG-m) from the classes which have packets to be transmitted (FL-m=1) and in which the current time does not reach the class limiting time (RL-m) on a condition that the current time (SC) exceeds the interface limiting time (IRL) when there is no class in which the class guarantee time (RG-m) is delayed from the current time (SC) (the decision of "NO" is obtained at the SP34).

Furthermore, a third aspect of the invention is directed to a bandwidth control program to be executed by a processing device in order to limit or guarantee a bandwidth for each of classes when transmitting a packet belonging to any of the classes to a communication network, comprising a first reading step (SP36) of reading, from a first register (32), an interface limiting time (IRL) to be the earliest time at which a packet can be subsequently transmitted from a transmitting device for transmitting a packet to the communication network in order to control a communication bandwidth of the transmitting device to be equal to or smaller than an allowable bandwidth (Ls) permitted for the transmitting device, a second reading step (SP44) of reading a class limiting time (RL-m) to be the earliest time at which a packet of a corresponding class can be subsequently transmitted from a second register (42-m) provided for each of the classes in order to control a communication bandwidth of the class to be equal to or smaller than an allowable bandwidth of the class, a third reading step (SP30, SP38) of reading a class guarantee time (RG-m) to be a final time at which a packet of a corresponding class is to be subsequently transmitted from a third register (44-m) provided for each of the classes in order to give the class a communication bandwidth which is equal to or greater than a guarantee bandwidth of the class, a class determining step (SP30 to SP46) of determining, as a transmitting object class, a class from which a packet is to be transmitted based on the class limiting time (RL-m) and the class guarantee time (RG-m) in each of the classes, a transmitting step (SP48) of transmitting a packet belonging to the transmitting object class, and a step of executing recalculating means (SP50) for recalculating the interface limiting time (IRL), the class limiting time (RL-m) of the transmitting object class and the class guarantee time (RG-m) of the transmitting object class based on a data volume of the packet belonging to the transmitting object class and storing results of the recalculation in the first to third registers.

Referring to a structure according to a fourth aspect of the invention, moreover, in the program according to the third aspect of the invention, the class determining step (SP30 to SP46) determines, as the transmitting object class, any of the classes having the class guarantee time (RG-m) delayed from a current time (SC) which is detected irrespective of the interface limiting time (IRL) when the same class is detected (a decision of "NO" is obtained at SP34), and determines, as the transmitting object class, any of the classes having the earliest class guarantee time (RG-m) from the classes which have packets to be transmitted (FL-m=1) and in which the current time does not reach the class limiting time (RL-m) on a condition that the current time (SC) exceeds the interface limiting time (IRL) when there is no class in which the class guarantee time (RG-m) is delayed from the current time (SC) (the decision of "NO" is obtained at the SP34).

According to the invention, thus, one class from which a packet is to be transmitted is determined as a transmitting object class and a packet belonging to the transmitting object class is transmitted based on the class limiting time and the class guarantee time of each class, and furthermore, the interface limitation time, the class limitation time of the transmitting object class and the class guarantee time of the transmitting object class are recalculated based on the data volume of the packet belonging to the transmitting object class. Therefore, it is not necessary to provide a packet queue over a plurality of stages, and it is possible to give a bandwidth guarantee and a bandwidth limitation for each of the classes while controlling a memory capacity. Furthermore, it is possible to set an interface limitation time independent of the class guarantee time and the class limitation time of each class. Therefore, it is possible to control the communication bandwidth of a whole terminal within an optional allowable bandwidth.

DETAILED DESCRIPTION OF PREFERRED EMBODIMENTS

1. Hardware Structure According to Example

Next, the structure of a router device according to an example of the invention will be described with reference to FIG. 1.

Figure 1:
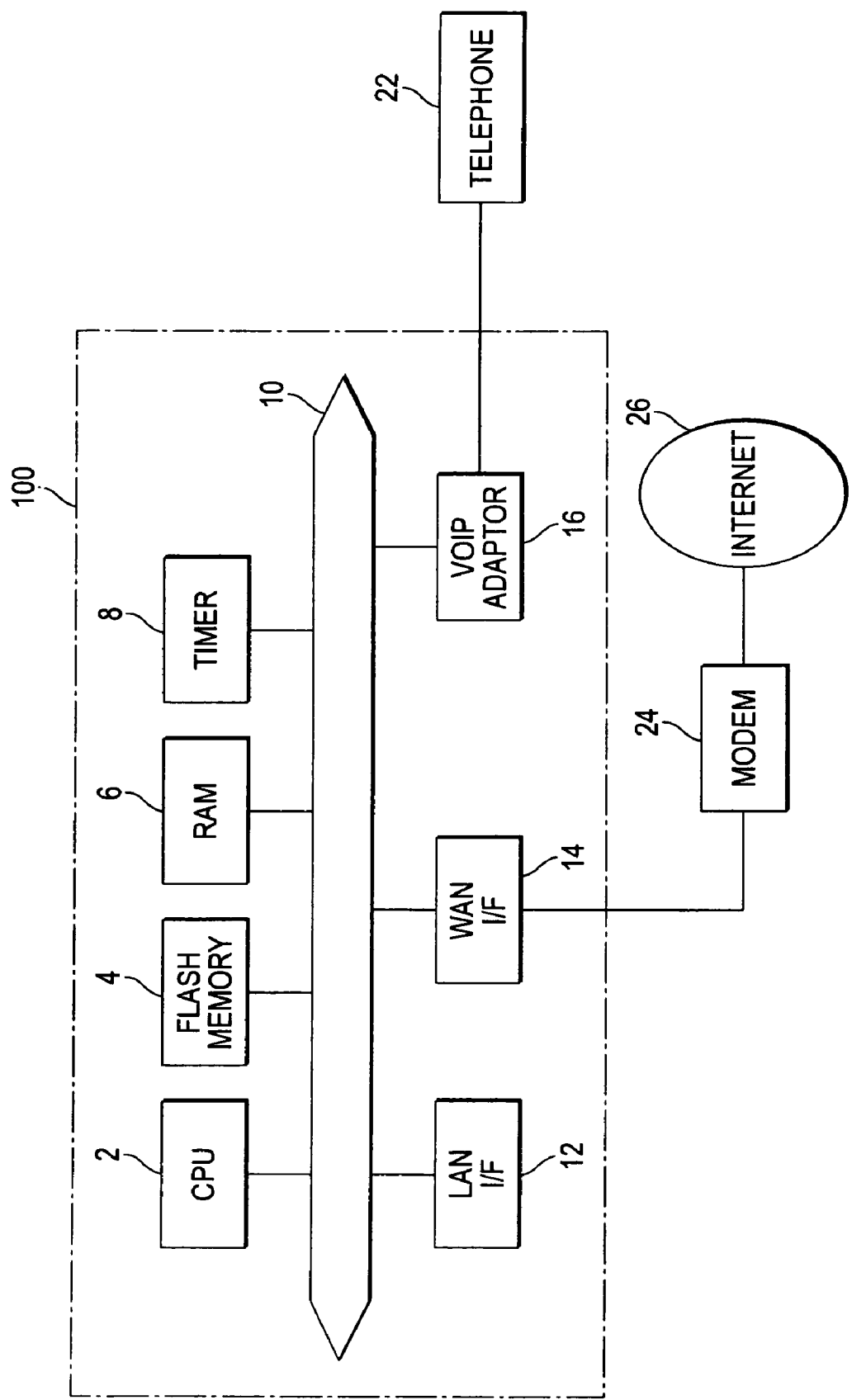
FIG. 1 is a block diagram showing a router device 100 according to an example of the invention.

In FIG. 1, 100 denotes a router device according to the example, and a CPU 2 provided therein controls each portion in the router device 100 through a bus 10 based on a control program stored in a flash memory 4. 6 denotes an RAM which is used as a work memory for the CPU 2. 8 denotes a timer which times a current time and generates a timer interruption for the CPU 2 if necessary. 12 denotes a LAN interface which is connected to a local area network (LAN) which is not shown. A Web server or a client computer is connected to the LAN if necessary. 14 denotes a WAN interface which is connected to an internet 26 through a modem 24. 16 denotes a VoIP (Voice over IP) adaptor which converts, into an IP packet, a voice signal and a control signal which are received from a telephone set 22 and transmits the IP packet through the WAN interface 14, and furthermore, converts the IP packet received through the WAN interface 14 into a voice signal or a control signal and supplies the same signal to the telephone set 22.

2. Data Structure According to Example

Figure 2:
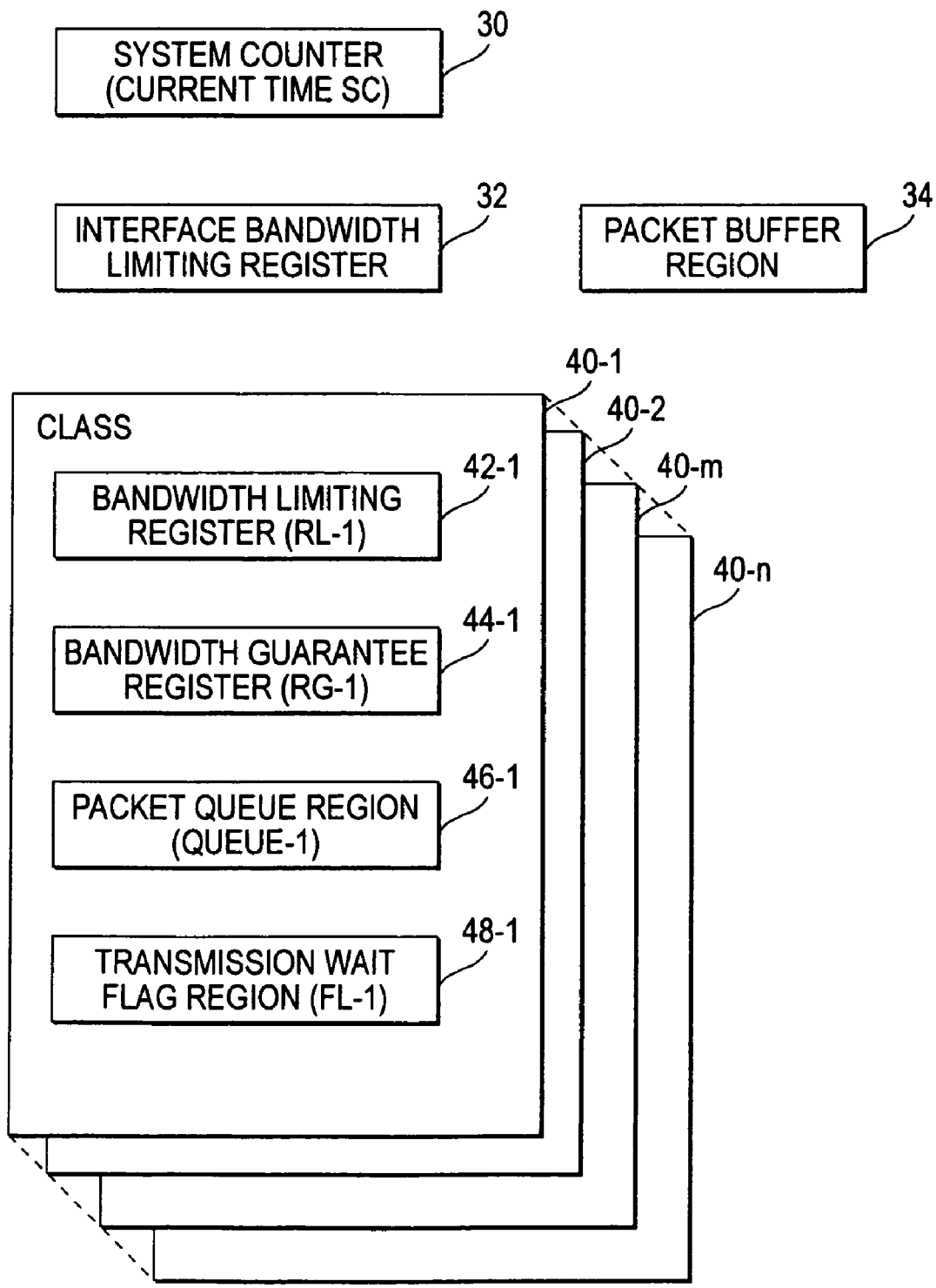
FIG. 2 is a diagram showing a data structure according to the example.

Next, various data to be used in the example will be described with reference to FIG. 2. In FIG. 2, 30 denotes a system counter which serves to store a current time SC to be updated successively. 32 denotes an interface bandwidth limiting register which serves to store interface bandwidth limiting timed at a IRL. Description will be given to the limiting time data IRL. The communication bandwidth of data which can be transmitted to the internet 26 through the WAN interface 14 by the router device 100, that is, the transmission speed of the data is limited. The limitation (interface allowable bandwidth) will be referred to as an "Ls bit per second". If the transmission of the IP packet having "P bits" is just started at a certain time t1, a time to be maintained for the IP packet is "P/Ls". Accordingly, another IP packet cannot be transmitted from the WAN interface 14 in principle until the current time SC reaches "t2=t1+P/Ls". The limiting time data IRL are data corresponding to the time t2. 34 denotes a packet buffer region in which the substance of an IP packet supplied through the WAN interface 14 or the VoIP adaptor 16 is stored.

Next, 40-m (m=1, 2, . . . , n) is a class region which is maintained for each class of the IP packet to be transmitted.

The "class" is obtained by classifying the IP packet corresponding to the uses of the packet (for example, for VoIP, an SMTP service and an HTTP service) or the local IP address of a device to be a transmitting source (the VoIP adaptor 16, a server and a client computer). 42-m is a bandwidth limiting register in the class region 40-m which serves to store class bandwidth limiting time data RL-m. As described above, a communication bandwidth is limited for each class in the same manner as the limitation of the communication bandwidth for the whole router device 100. If a limitation (class allowable bandwidth) for the class m is set to be "Lcm bit per second" and the transmission of the IP packet having "P bits" of the class m is started at the time t1, another IP packet of the class cannot be transmitted until the current time SC reaches "t3=t1+P/Lcm". The limiting time data RL-m are data corresponding to the time t3.

44-m denotes a bandwidth guarantee register which serves to store class bandwidth guarantee timed at a RG-m. In some cases, a communication bandwidth is guaranteed at a minimum to some degree depending on the type of the class. For example, a telephone communication through the VoIP corresponds thereto. While a UDP/IP protocol is employed in the VoIP, the retransmission control of a packet is not carried out in the same protocol. In the case in which an IP packet for certain voice data is to be transmitted at a certain time, accordingly, the voice data do not reach the other party when the IP packet cannot be transmitted. Thus, there is a problem in that quality of a communication is remarkably deteriorated when a situation in which the IP packet cannot be transmitted at all is brought in the VoIP. For this reason, it is desirable that the communication bandwidth should be guaranteed at a minimum to some degree. If a bandwidth (a class guarantee bandwidth) guaranteed for the class m is represented as "Gcm bit per second" and the transmission of the IP packet of the "P bit" for the class m is started at the time t1, a time at which the IP packet for the class m is to be transmitted next is to be "t4=t1+P/Gcm" at latest. The guarantee time data RG-m correspond to the time t4.

46-m denotes a packet queue region serving to store a list in which the pointer of an IP packet belonging to the class m in the IP packet stored in the packet buffer region 34 is set to be an element. In the list, each element is linked in order of the receiving time of a corresponding IP packet (which is equal to the order of a transmission). The list will be referred to as a "packet queue QUEUE-m". 48-m denotes a transmission wait flag region in which a transmission wait flag FL-m is stored. The transmission wait flag FL-m is set to be "1" when the packet queue QUEUE-m includes at least one element and is set to be "0" when the packet queue QUEUE-m is empty.

3. Operation According to Example 3.1. IP Packet Receipt Processing

Next, the operation according to the example will be described.

Figure 3:
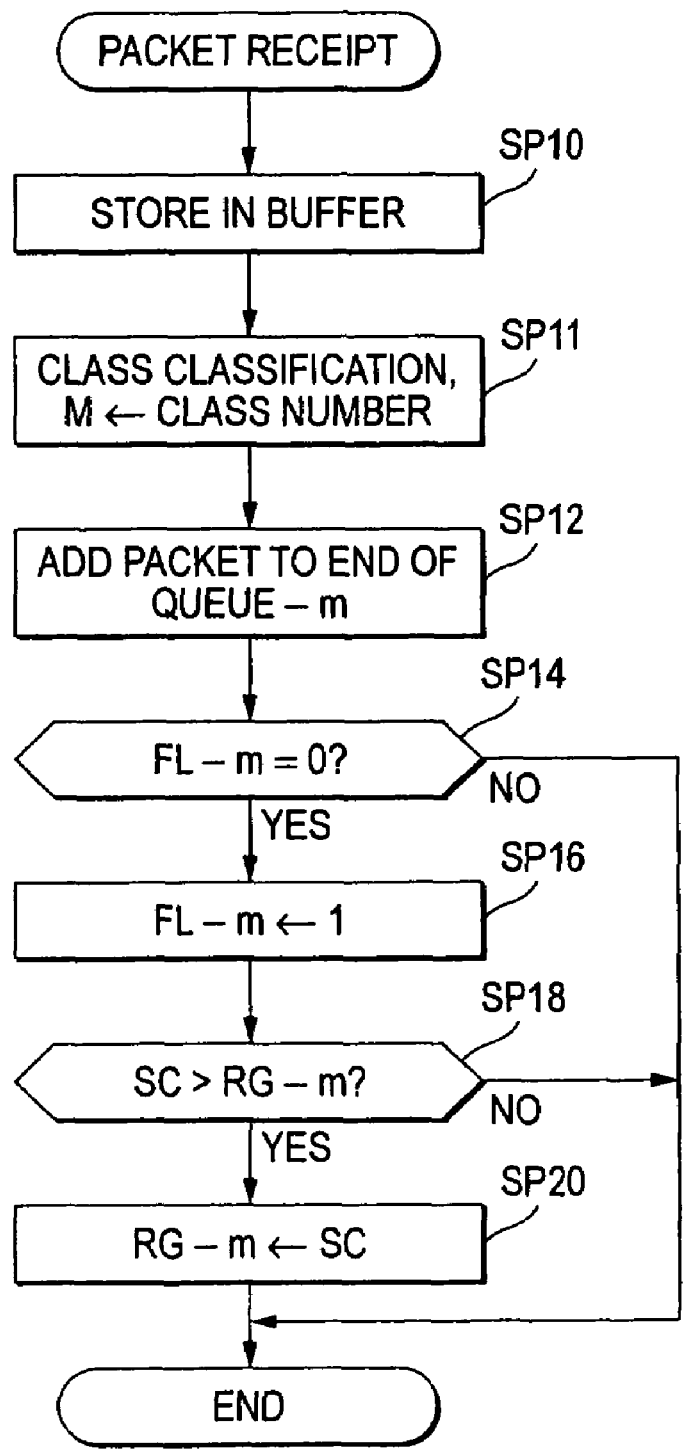
FIG. 3 is a flowchart showing an IP packet receiving routine.

When an IP packet to be transmitted from the WAN interface 14 through the LAN interface 12 or the VoIP adaptor 16 is received, an IP packet receiving routine shown in FIG. 3 is started. When a processing proceeds to Step SP10 in FIG. 3, the substance of the received IP packet is stored in the packet buffer region 34. When the processing proceeds to Step SP11, next, the IP packet is classified into any class corresponding to a local IP address to be the transmission source of the IP packet or an upper protocol (TCP or UDP) of the IP protocol. Herein, the number of a class to be a classifying destination will be referred to as "m".

When the processing proceeds to Step SP12, then, a new element having the pointer of an IP packet received earlier to be contents is added to the end of the packet queue QUEUE-m of the class m. When the processing proceeds to Step SP14, subsequently, it is decided whether the transmission wait flag FL-m is "0" or not (whether the packet queue QUEUE-m is empty or not till a time immediately before the Step SP12). When a decision of "YES" is obtained, the processing proceeds to Step SP16 in which the transmission wait flag FL-m is changed to "1". The reason is that the new element is added in the Step SP12 and the packet queue QUEUE-m is therefore prevented from being empty. When the processing proceeds to Step SP18, thereafter, it is decided whether the current time SC exceeds the guarantee time data RG-m or not. When the decision of "YES" is obtained, the processing proceeds to Step SP20 in which the guarantee time data RG-m are changed to the current time SC. When a decision of "NO" is obtained at the Step SP14 or SP18, the processing of the routine is ended immediately.

Description will be given to the reason why the guarantee time data RG-m are changed to the current time SC at the Step SP20. The guarantee time data RG-m have a value determined to maintain a class guarantee bandwidth Gcm of the class m. In the case in which an IP packet to be transmitted is not originally present, the class guarantee bandwidth Gcm cannot be maintained and does not need to be maintained. In a processing which will be described below, moreover, "an abnormal situation in which a bandwidth to be guaranteed for the class m is not maintained" is regarded to be brought when the guarantee time data RG-m are less than the current time SC. Also in the case in which the interface allowable bandwidth Ls is exceeded temporarily, the IP packet of the class m is transmitted particularly preferentially. In the case in which a difference between the guarantee time data RG-m and the current time SC is great, particularly, a situation in which the IP packet of the class m is transmitted repetitively and preferentially is brought. However, the case in which the Step SP18 is executed is restricted to the case in which an element is not originally present in the packet queue QUEUE-m of the class m. For this reason, it is not necessary to transmit the IP packet of the class m very preferentially. Therefore, the guarantee time data RG-m are set to be the current time SC.

3.2. Transmitting Schedule Interruption Processing

Figure 4:
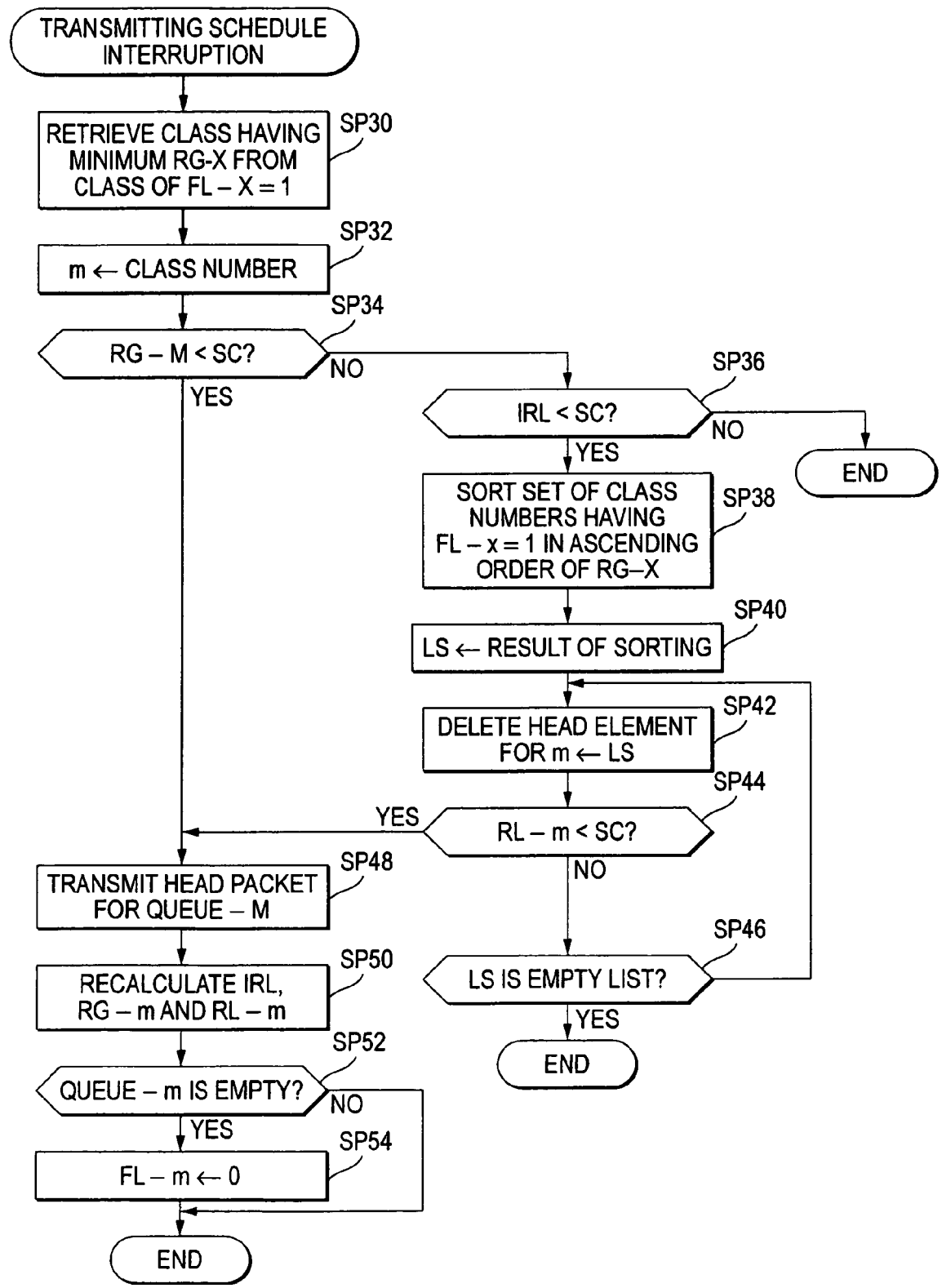
FIG. 4 is a flowchart showing a transmitting schedule interruption processing routine.

In the CPU 2, an interruption, that is, "a transmitting schedule interruption" is generated every predetermined time. When the interruption is generated, a transmitting schedule interruption processing routine shown in FIG. 4 is started. When the processing proceeds to Step SP30 in the drawing, at least one class having a transmission wait flag FL-x of "1" is retrieved from all of classes x (x=1, 2, . . . , n) and a class having minimum guarantee time data RG-x is retrieved therefrom. When the processing proceeds to Step SP32, next, the number of the class thus retrieved is stored in a variable m. When the processing proceeds to Step SP34, then, it is decided whether the guarantee time data RG-m of the class m are less than the current time SC or not.

3.2.1. The Case in which the Guarantee Bands of all Classes are Maintained

When a decision of "NO" is obtained at the Step SP34, the processing proceeds to Step SP36. At the Step SP34, it is decided whether or not the condition of "RG-m<SC" is satisfied for RG-m to be the minimum guarantee time data. In the case in which the decision of "NO" is obtained, therefore, "RG-x<SC" is established for all of the classes x from which the IP packet is to be transmitted. Under the existing circumstances, the guarantee bands of all the classes are exactly maintained. At the Step SP36, it is decided whether the interface bandwidth limiting time data IRL are less than the current time SC or not. When the IP packet is transmitted if the limiting time data IRL are less than the current time SC, the IP packet is transmitted in such a state as to exceed the allowable bandwidth of the whole WAN interface 14. When the decision of "NO" is obtained, therefore, the processing of the routine is ended immediately.

On the other hand, if the decision of "YES" is obtained at the Step SP36, the processing proceeds to Step SP38 in which a set of class numbers having the transmission wait flag FL-x of "1" is sorted in the ascending order of the guarantee time data RG-x. When the processing proceeds to Step SP40, next, the result of the sorting is stored as a list LS in the RAM 6. When the processing proceeds to Step SP42, then, a class number to be an element on the head of the list LS is stored in the variable m and the element on the head is deleted from the list LS. When the processing proceeds to Step SP44, thereafter, it is decided whether the limiting time data RL-m of the class m are less than the current time SC or not. If the limiting time data RL-m are less than the current time SC, the allowable bandwidth of the class m is exceeded when the IP packet belonging to the class m is transmitted. For this reason, the IP packet cannot be transmitted. In such a case, the decision of "NO" is obtained at the Step S44 and the processing proceeds to Step SP46.

At the Step SP46, it is decided whether the list LS is empty or not. If the decision of "NO" is obtained, the processing returns to the Step SP42 in which the element on the head of the list LS is deleted from the list LS again and the class number to be the element thus deleted is stored in the variable m. Subsequently, the processings of the Steps SP42 and SP44 are repeated for the residual elements of the list LS until the decision of "YES" is obtained at the Step SP44. The decision of the Step SP44 is executed for all of the elements of the list LS. When the final result of the decision is "NO", the list LS should have been empty at this time. Therefore, the decision of "YES" is obtained at the Step SP46 and the processing of the routine is ended. In such a case, although a transmitted data volume is controlled within the range of an allowable bandwidth in the whole WAN interface 14 (the decision of "YES" has been obtained at the Step SP36), a data volume cannot be controlled within the allowable bandwidth of each class as seen for each class. After all, an IP packet which can be transmitted is not present. Accordingly, the processing is ended in a state in which the transmission processing of the IP packet is not carried out.

On the other hand, when the condition of "RL-m<SC" is satisfied for any of the classes m in the middle of the execution of the loop of the Steps SP42 to SP46, the decision of "YES" is obtained at the Step SP44 and the processing proceeds to Step SP48. The transmission of an IP packet specified by an element (pointer) on the head of the packet queue QUEUE-m is started and the element on the head of the packet queue QUEUE-m is also deleted. In the routine, when the transmission of the IP packet is started at the Step SP48, the processing proceeds to Step SP50 also in a state in which the transmission of all bits in the IP packet has not been completed.

At the Step SP50, the interface bandwidth limiting time data IRL, the class bandwidth limiting time data RL-m and the class bandwidth guarantee time data RG-m are recalculated and the results of the recalculation are stored in the corresponding registers 32, 42-m and 44-m. An equation for a specific recalculation at the Step SP50 will be described below. When the processing proceeds to Step SP52, next, it is decided whether the packet queue QUEUE-m is empty or not. When the decision of "YES" is obtained, the processing proceeds to Step SP54 in which the transmission wait flag FL-m is set to be "0". Consequently, the processing of the routine is ended. Even if the processing of the routine is ended, the transmission of the IP packet has not been completed. In the WAN interface 14, therefore, the contents of the IP packet are gradually output to the internet 26 through the modem 24. When the transmission of the IP packet is completely ended, then, the substance of the IP packet is deleted in the packet buffer region 34.

3.2.2. The Case in which there is a Class Having No Guarantee Bandwidth Maintained Next, description will be given to a processing to be carried out in the case in which the decision of "YES" is obtained at the Step SP34, that is, the condition of "RG-m<SC" is satisfied. The satisfaction of the condition of "RG-m<SC" exactly implies that a guarantee bandwidth is not maintained for at least the class m. The processings of the Steps SP48 to SP54 are immediately executed for the class m and the IP packet related to the class m is transmitted. In this case, it is not decided whether the current time SC exceeds the limiting time data IRL or not as in the Step SP36.

Although the current time SC is less than the limiting time data IRL, accordingly, there is a possibility that a processing of transmitting the IP packet might be carried out. In such a case, the bandwidth of the IP packet may temporarily exceed the interface allowable bandwidth Ls. However, the interface allowable bandwidth Ls has a value to be obeyed as a mean value and may have a greater bandwidth on a peak basis in many cases. In the example, therefore, when a situation in which a guarantee bandwidth is not maintained is brought in any class, the IP packet of the same class is immediately sent even if the interface allowable bandwidth Ls is exceeded temporarily.

3.2.3 Recalculation of IRL, RL-m and RG-m (SP50)

Figure 5A:
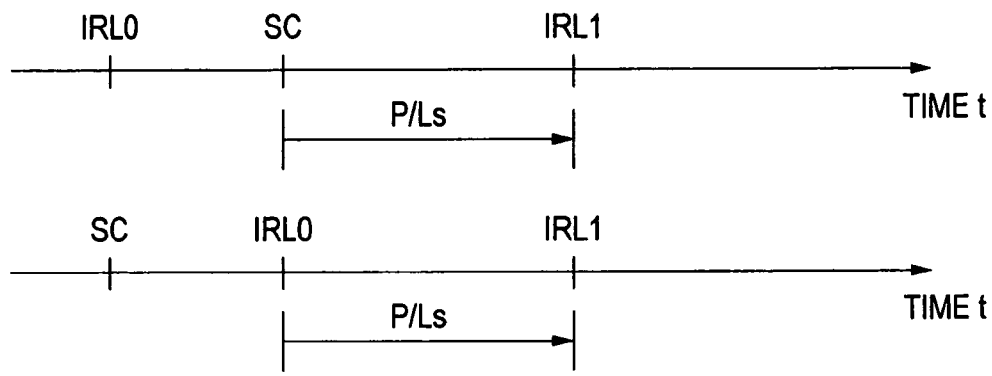
FIGS. 5A-C are timing charts showing the example.
Figure 5B:
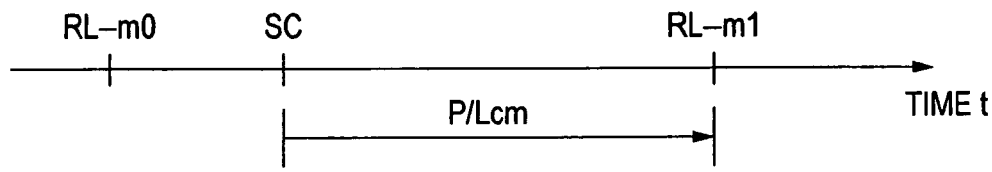
Figure 5C:
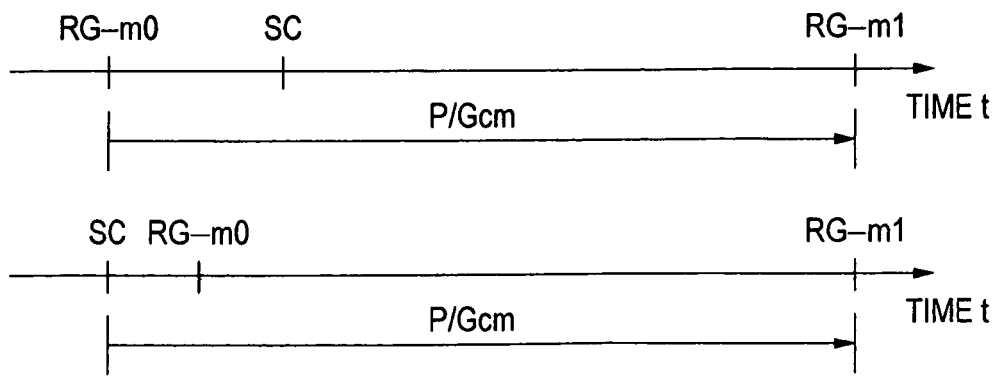

Referring to FIGS. 5(a) to 5(c), next, description will be given to a method of recalculating the limiting time data IRL and RL-m and the guarantee time data RG-m at the Step SP50. In these drawings, the value of each time data is represented by a position on a time axis, and "0" is added after the name of each time data before the execution of the update at the Step SP50 and "1" is added after the name of each time data after the update.

In FIG. 5(a), an update value IRL1 of the interface bandwidth limiting time data IRL is calculated by the following equation (1).

$$IRL1 = \max(IRL0, SC) + P/Ls \qquad (1)$$

In the equation (1), P represents a data volume (bit) of a packet which is transmitted and Ls represents an interface allowable bandwidth (bit per second).

In a normal transmission state (the case in which the processings after the Step S36 are executed), the IP packet is sent with the condition of "IRL<SC" always satisfied. Therefore, the limiting time data IRL1 after the update are to be determined based on the packet data volume P and the interface allowable bandwidth Ls by setting the current time SC (which is equal to a packet transmitting start time) to be a reference. In the case in which the decision of "YES" is obtained at the Step SP34 and the Step SP48 is immediately executed, however, it is also possible to suppose the case in which the IP packet is sent in the state of "IRL>SC" and the transmitting bandwidth of the WAN interface 14 exceeds the interface allowable bandwidth Ls on a peak basis. In such a case, it is necessary to obey the allowable bandwidth Ls as a mean value. Therefore, the limiting time data IRL1 after the update are to be determined on the basis of the limiting time data IRL0 before the update. In the example, accordingly, the update value IRL1 of the limiting time data is determined based on "max (IRL0, SC)".

In FIG. 5(b), next, an update value RL-m1 of the class bandwidth limiting time data RL-m is calculated in the following equation (2).

$$RL\text{-}m1 = SC + P/Lcm \tag{2}$$

In the equation (2), Lcm represents an allowable bandwidth (bit per second) of the class m. The IP packet of the class m is transmitted only when the limiting time data RL-m are less than the current time SC (see the Step SP44). Therefore, a timing which can be a reference for the determination of the limiting time data RL-m1 is only the current time SC and it is not necessary to consider limiting time data RL-m0 before the update.

In FIG. 5(c), subsequently, an update value RG-m1 of the guarantee time data RG-m is calculated in the following equation (3).

$$RG\text{-}m1 = \min(RG\text{-}m0, SC) + P/Gcm \tag{3}$$

In the equation (3), Gcm represents a guarantee bandwidth (bit per second) of the class m. The IP packet of the class m is usually output in a situation in which "RG-m0>SC" is set. In such a case, when the next guarantee time data RG-m1 are determined on the basis of the current time SC, therefore, a communication bandwidth having a class guarantee bandwidth Gcm or more as a whole can be maintained for the class m. If the IP packet is transmitted in a state in which "RG-m0<SC" is set (a state in which the decision of "YES" is obtained at the Step SP34), however, the class guarantee bandwidth Gcm is not maintained for a short period at that time. In such a case, therefore, the update value RG-m1 is to be determined on the basis of the guarantee time data RG-m0 before the update in order to maintain the class guarantee bandwidth Gcm as a mean value. In the example, accordingly, the update value RG-m1 of the guarantee time data is determined on the basis of "min (RG-m0, SC)."

4. Variant

The invention is not restricted to the example described above but various changes can be made in the following manner, for example.

(1) While the bandwidth limitation and guarantee processings have been executed in accordance with the program to be operated on the CPU 2 in the example, an equivalent processing to these processings may be executed in hardware.

(2) While the bandwidth limitation and guarantee processings have been executed in accordance with the program to be operated on the CPU 2 in the example, only these programs can be stored in a recording medium such as a CD-ROM or a flexible disk and can be distributed or can also be distributed through a transmission path.

What is claimed is:

1. A bandwidth control device for limiting and guaranteeing a bandwidth for each of classes when transmitting a packet belonging to any of the classes to a communication network, comprising:

a first register for storing an interface limiting time to be the earliest time at which a packet can be subsequently transmitted from a transmitting device for transmitting a packet to the communication network in order to control a communication bandwidth of the transmitting device to be equal to or smaller than an allowable bandwidth permitted for the transmitting device;

a second register provided for each of the classes and serving to store a class limiting time to be the earliest time at which a packet of a corresponding class can be subsequently transmitted in order to control a communication bandwidth of the class to be equal to or smaller than an allowable bandwidth of the class;

a third register provided for each of the classes and serving to store a class guarantee time to be a final time at which a packet of a corresponding class is to be subsequently transmitted in order to give the class a communication bandwidth which is equal to or greater than a guarantee bandwidth of the class;

a class determining unit for determining, as a transmitting object class, a class from which a packet is to be transmitted based on the class limiting time and the class guarantee time in each of the classes;

a transmitter for transmitting a packet belonging to the transmitting object class; and a calculator for recalculating the interface limiting time, the class limiting time of the transmitting object class, and the class guarantee time of the transmitting object class based on a data volume of the packet belonging to the transmitting object class and storing results of the recalculation in the first to third registers.

2. The bandwidth control device according to claim 1, wherein the class determining unit determines, as the transmitting object class, any of the classes having the class guarantee time delayed from a current time which is detected irrespective of the interface limiting time when the same class is detected, and when there is no class in which the class guarantee time is delayed from the current time, the class determining unit determines, as the transmitting object class, any of the classes having the earliest class guarantee time from the classes which have packets to be transmitted and in which the current time does not reach the class limiting time on a condition that the current time exceeds the interface limiting time.

3. A computer readable recording medium storing a bandwidth control program to be executed by a processing device in order to limit and guarantee a bandwidth for each of classes when transmitting a packet belonging to any of the classes to a communication network, the program causing the processing device to execute:

a first reading step of reading, from a first register, an interface limiting time to be the earliest time at which a packet can be subsequently transmitted from a transmitting device for transmitting a packet to the communication network in order to control a communication bandwidth of the transmitting device to be equal to or smaller than an allowable bandwidth permitted for the transmitting device;

a second reading step of reading a class limiting time to be the earliest time at which a packet of a corresponding class can be subsequently transmitted from a second register provided for each of the classes in order to control a communication bandwidth of the class to be equal to or smaller than an allowable bandwidth of the class;

a third reading step of reading a class guarantee time to be a final time at which a packet of a corresponding class is to be subsequently transmitted from a third register provided for each of the classes in order to give the class a communication bandwidth which is equal to or greater than a guarantee bandwidth of the class;

a class determining step of determining, as a transmitting object class, a class from which a packet is to be transmitted based on the class limiting time and the class guarantee time in each of the classes;

a transmitting step of transmitting a packet belonging to the transmitting object class; and a recalculating step of recalculating the interface limiting time, the class limiting time of the transmitting object class and the class guarantee time of the transmitting object class based on a data volume of the packet belonging to the transmitting object class and storing results of the recalculation in the first to third registers.

4. The program according to claim 3, wherein the class determining step determines, as the transmitting object class, any of the classes having the class guarantee time delayed from a current time which is detected irrespective of the interface limiting time when the same class is detected, and, when there is no class in which the class guarantee time is delayed from the current time, the class determining step determines, as the transmitting object class, any of the classes having the earliest class guarantee time from the classes which have packets to be transmitted and in which the current time does not reach the class limiting time on a condition that the current time exceeds the interface limiting time.

5. A method of controlling a bandwidth control device which limits and guarantees a bandwidth for each of classes when transmitting a packet belonging to any of the classes to a communication network, the method comprising:

reading, from a first register, an interface limiting time to be the earliest time at which a packet can be subsequently transmitted from a transmitting device for transmitting a packet to the communication network in order to control a communication bandwidth of the transmitting device to be equal to or smaller than an allowable bandwidth permitted for the transmitting device;

reading a class limiting time to be the earliest time at which a packet of a corresponding class can be subsequently transmitted from a second register provided for each of the classes in order to control a communication bandwidth of the class to be equal to or smaller than an allowable bandwidth of the class;

reading a class guarantee time to be a final time at which a packet of a corresponding class is to be subsequently transmitted from a third register provided for each of the classes in order to give the class a communication bandwidth which is equal to or greater than a guarantee bandwidth of the class;

determining, as a transmitting object class, a class from which a packet is to be transmitted based on the class limiting time and the class guarantee time in each of the classes;

transmitting a packet belonging to the transmitting object class; and recalculating the interface limiting time, the class limiting time of the transmitting object class and the class guarantee time of the transmitting object class based on a data volume of the packet belonging to the transmitting object class and storing results of the recalculation in the first to third registers.

6. The method according to claim 5, wherein the class determining step determines, as the transmitting object class, any of the classes having the class guarantee time delayed from a current time which is detected irrespective of the interface limiting time when the same class is detected, and, when there is no class in which the class guarantee time is delayed from the current time, the class determining step determines, as the transmitting object class, any of the classes having the earliest class guarantee time from the classes which have packets to be transmitted and in which the current time does not reach the class limiting time on a condition that the current time exceeds the interface limiting time.

* * * * *